United States Patent
Kuwayama et al.

(10) Patent No.: US 10,427,459 B2
(45) Date of Patent: Oct. 1, 2019

(54) PNEUMATIC TIRE

(71) Applicant: BRIDGESTONE CORPORATION, Tokyo (JP)

(72) Inventors: Isao Kuwayama, Tokyo (JP); Shintaro Hatanaka, Tokyo (JP); Kentaro Kozuki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 111 days.

(21) Appl. No.: 15/302,322

(22) PCT Filed: Apr. 8, 2015

(86) PCT No.: PCT/JP2015/001988
§ 371 (c)(1),
(2) Date: Oct. 6, 2016

(87) PCT Pub. No.: WO2015/155992
PCT Pub. Date: Oct. 15, 2015

(65) Prior Publication Data
US 2017/0021669 A1    Jan. 26, 2017

(30) Foreign Application Priority Data
Apr. 9, 2014   (JP) .................. 2014-080400

(51) Int. Cl.
*B60C 5/14*    (2006.01)
*B60C 19/00*   (2006.01)
*B60C 9/06*    (2006.01)

(52) U.S. Cl.
CPC ................. *B60C 5/14* (2013.01); *B60C 9/06* (2013.01); *B60C 19/002* (2013.01)

(58) Field of Classification Search
CPC ............ B60C 5/14; B60C 19/002; B60C 9/06
See application file for complete search history.

(56) References Cited

U.S. PATENT DOCUMENTS 4,284,117 A * 8/1981 Poque .................. B60C 9/2009
                                                    152/527
4,840,213 A * 6/1989 Koseki ..................... B60C 3/04
                                                    152/454

(Continued)

FOREIGN PATENT DOCUMENTS

CN          101068689 A     11/2007
CN          102056754 A      5/2011

(Continued)

OTHER PUBLICATIONS

Machine translation of JP2003-165303 (no date).*

(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

To reduce noise while suppressing increase in rolling resistance, without affecting the formation of a carcass line, provided is a pneumatic tire 10 comprising an inner liner 17. The thickness of the inner liner 17 at least in part of a side portion 18 is 1.5 mm or more. When the tire 10 is mounted to a rim, and an internal pressure of 250 kPa or more is applied to the tire, in a case where a sectional width SW of the tire is less than 165 mm, a ratio of the sectional width SW to an outer diameter OD of the tire, SW/OD, is 0.26 or less; and in a case where the sectional width SW of the tire is 165 mm or more, the sectional width SW and the outer diameter OD of the tire satisfy a relation expression OD≥2.135×SW+282.3.

15 Claims, 10 Drawing Sheets

(56) References Cited

U.S. PATENT DOCUMENTS

| | | | | |
|---|---|---|---|---|
| 5,386,866 | A | * | 2/1995 | Suzuki .................. B60C 9/2204 152/531 |
| 5,553,646 | A | * | 9/1996 | Ando ........................ B60C 3/04 152/209.14 |
| 5,824,170 | A | | 10/1998 | Weston et al. |
| 6,568,444 | B1 | * | 5/2003 | Kaneko ...................... B60C 3/04 152/209.18 |
| 2008/0093001 | A1 | | 4/2008 | Ono |
| 2011/0083780 | A1 | | 4/2011 | Hayashi et al. |
| 2012/0125508 | A1 | * | 5/2012 | Ichihara .................... B60C 9/26 152/527 |
| 2014/0158263 | A1 | | 6/2014 | Hatanaka et al. |

FOREIGN PATENT DOCUMENTS

| | | | |
|---|---|---|---|
| EP | 0722850 | A1 | 7/1996 |
| EP | 0 614 774 | B1 | 5/1997 |
| EP | 1 350 639 | A1 | 10/2003 |
| EP | 2 228 238 | A1 | 9/2010 |
| EP | 2 781 372 | A1 | 9/2014 |
| EP | 3 115 227 | A1 | 1/2017 |
| JP | 2-127101 | A | 5/1990 |
| JP | 04108003 | A * | 4/1992 |
| JP | 6-40206 | A | 2/1994 |
| JP | 07164821 | A * | 6/1995 ......... B60C 11/0058 |
| JP | 08164718 | A * | 6/1996 |
| JP | 2003-165303 | A | 6/2003 |
| JP | 2006-188218 | A | 7/2006 |
| JP | 2007-62541 | A | 3/2007 |
| JP | 2007-182123 | A | 7/2007 |
| JP | 2008168800 | A * | 7/2008 |
| JP | 2010-215020 | A | 9/2010 |
| WO | 2013/014950 | A1 | 1/2013 |
| WO | 2013/065319 | A1 | 5/2013 |

OTHER PUBLICATIONS

BOTO(Michelin) Heavy radial duty truck tires 12.00R24 retrieved from https://www.alibaba.com/product-detail/BOTO-Michelin-Heavy-radial-duty-truck_633502851.html on Apr. 13, 2018.*
Machine translation of JP-2008168800-A (no date).*
Machine translation of JP-07164821-A (no date).*
Machine translation of JP-08164718-A (no date).*
Machine translation of JP-04108003-A (no date).*
International Search Report for PCT/JP2015/001988 dated Jun. 9, 2015 [PCT/ISA/210].
Communication dated Jan. 10, 2018, from the State Intellectual Property Office of People's Republic of China in counterpart Application No. 201580018799.X.
Communication dated Aug. 3, 2018 from the State Intellectual Property Office of the P.R.C. in counterpart Application No. 201580018799.X.

* cited by examiner

WIDE GROUND CONTACT SHAPE

NARROW GROUND CONTACT SHAPE

PNEUMATIC TIRE

CROSS REFERENCE TO RELATED APPLICATIONS

This application is a National Stage of International Application No. PCT/JP2015/001988, filed on Apr. 8, 2015, which claims priority from Japanese Patent Application No. 2014-080400, filed on Apr. 9, 2014, the contents of all of which are incorporated herein by reference in their entirety.

TECHNICAL FIELD

A pneumatic tire is disclosed.

BACKGROUND

In recent years, vehicles have been demanded to have improved silence, and tires are required to cause reduced noise whilst maintaining various performances such as rolling resistance needed therefor. For example, noise may be reduced in a pneumatic tire which includes, between the carcass layer and the belt layer provided in the tread portion, a rubber layer disposed at a position intersecting the tire equator plane, so as to shift the frequency range of the cross-sectional secondary vibration mode to the lower frequency side (see JP2007-182123A (PTL: 1)).

CITATION LIST

Patent Literature

PTL 1: JP2007-182123A

SUMMARY

Technical Problem

However, additionally providing a rubber layer between the carcass layer and the belt layer as in PTL 1 is likely to affect the formation of a desired carcass line, and thus the configuration of PTL 1 has been unsuitable to some tires.

It could therefore be helpful to provide a tire capable reducing noise without affecting the carcass line, and also of suppressing increase in rolling resistance.

Solution to Problem

In light of the above, the tire of this disclosure is a pneumatic tire comprising an inner liner, wherein: a thickness of the inner liner at least in part of a side portion of the tire is 1.5 mm or more; when the tire is mounted to a rim, and an internal pressure of 250 kPa or more is applied to the tire, in a case where a sectional width SW of the tire is less than 165 mm, a ratio of the sectional width SW to an outer diameter OD of the tire, SW/OD, is 0.26 or less; and in a case where the sectional width SW of the tire is 165 mm or more, the sectional width SW and the outer diameter OD of the tire satisfy a relation expression OD≥2.135×SW+282.3. The "rim" refers to the one having the width corresponding to a bead width of the tire. According to the tire of this disclosure, due to an inner liner having a thickness of the aforementioned lower limit or more, tire noise can be reduced. Moreover, according to the tire of this disclosure, the thickness of the inner liner is increased, and thus formation of a desired carcass line is not affected. Moreover, according to the tire of this disclosure, the tire is formed in a manner such that the sectional width SW and the outer diameter OD of the tire have a specific correlation, and thus increase of rolling resistance is suppressed.

Further, in the disclosed tire, the inner liner may preferably have a thickness of 2.8 mm or less. This configuration reliably suppresses increase in rolling resistance.

Further, in the disclosed tire, the inner liner has, at least in part of the side portion, a thickness which may preferably be larger than the thickness thereof in the rest of the side portion. This configuration can further reduce tire noise.

Advantageous Effect

The disclosed tire configured as above is capable reducing in-vehicle noise of 80 Hz to 100 Hz without affecting the carcass line, and al so of suppressing increase in rolling resistance.

DETAILED DESCRIPTION

Hereinafter, an embodiment of this disclosure will be described with reference to the drawings.

Figure 1:
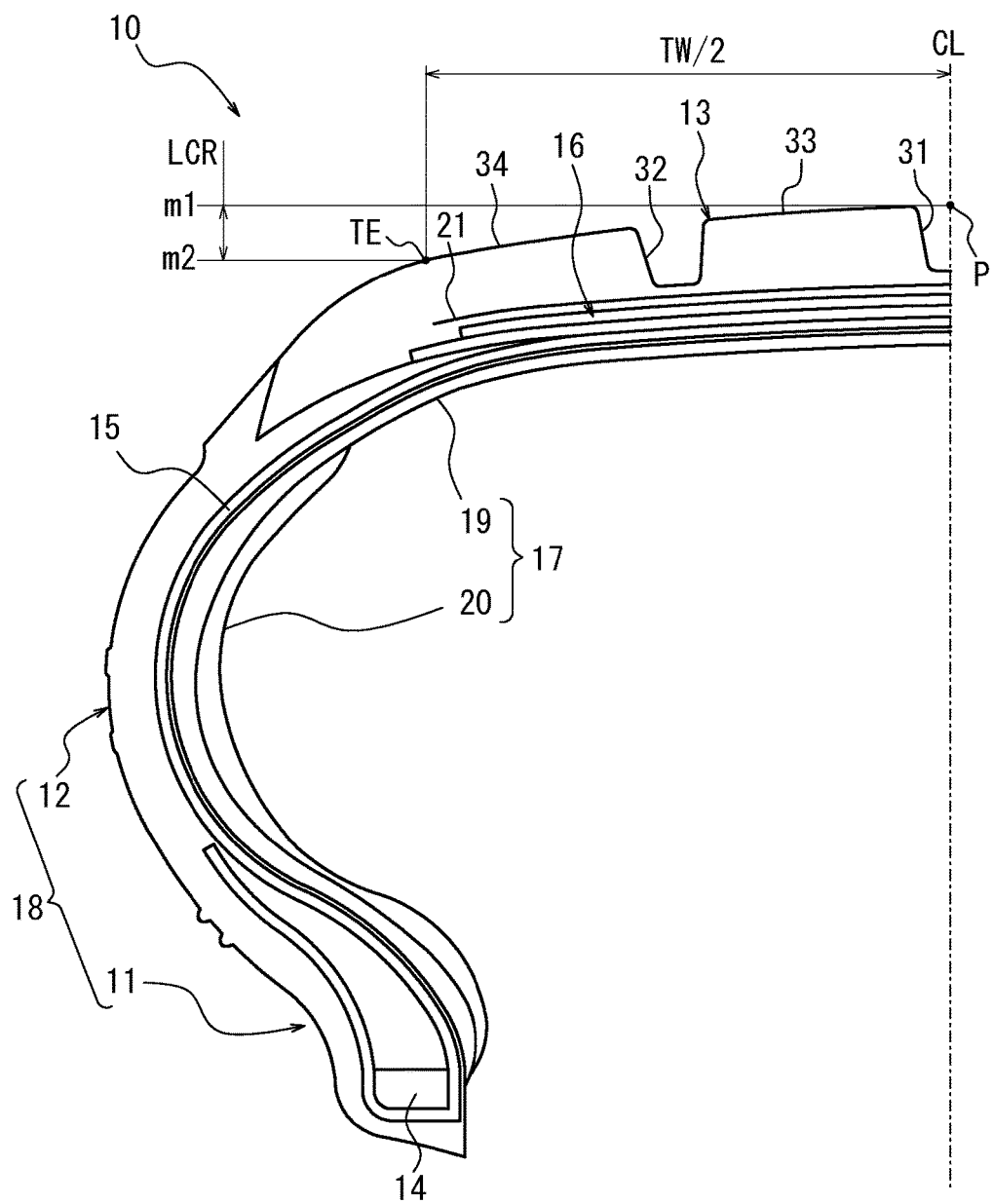
FIG. 1 is a partial sectional view in the tire width direction of the disclosed tire according to an embodiment.

First, a pneumatic tire according to an embodiment of this disclosure (hereinafter referred to merely as "tire") is described. FIG. 1 is a partial sectional view in the tire width direction of a one-side half of the disclosed tire, where the tire is mounted on a rim, filled with an internal pressure of 300 kPa, in a no-load state where no load is applied thereon. Here, in FIG. 1, illustration of the other half of the tire is omitted. Various shapes in this disclosure refer to those in this state unless specifically explained otherwise.

As illustrated in FIG. 1, the disclosed pneumatic tire 10 according to this embodiment is composed of a pair of bead portions 11, a sidewall portion 12 continuing from the bead portion 11, and a tread portion 13 coupling the sidewall portions 12 on both sides. The pneumatic tire 10 further includes: a carcass 15 composed of a ply of radially-arranged cords extending toroidally across a pair of bead cores 14 embedded in the pair of bead portions 11; an inclined belt 16 disposed outside in the tire radial direction in the crown portion of the carcass 15; and an inner liner 17 disposed inside the carcass 15.

Figure 2:
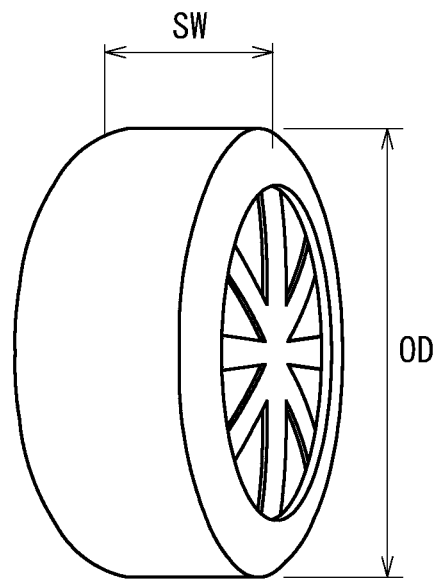
FIG. 2 illustrates the section width and the outer diameter of the tire of FIG. 1.

The inner liner 17 has a thickness of 1.5 mm or more at least in part of the side portion 18 formed of the bead portion 11 and the sidewall portion 12. Here, the thickness of the inner liner 17 refers to a thickness of the thinnest site of the inner liner 17. In this embodiment, the inner liner 17 has a thickness of 1.5 mm or more throughout the entire region in a width-direction section. Further, FIG. 1 illustrates the thickness of the inner liner 17 (i.e., a first inner liner rubber 19 and a second inner liner rubber 20 to be described later) to be slightly thicker than in reality for the sake of emphasis and clarity. The pneumatic tire 10 has a section width SW and an outer diameter OD as shown in FIG. 2, which satisfy the following relation when the internal pressure is defined to be 250 kPa or higher. That is, when the section width SW of the pneumatic tire 10 is less than 165 mm, SW/OD is 0.26 or less. Meanwhile, when the section width SW of the pneumatic tire is 165 mm or larger, the outer diameter OD satisfies OD≥2.135×SW+282.3.

The aforementioned configuration allows for suppressing in-vehicle noise of 80 Hz to 100 Hz without affecting the formation of a carcass line, as will be described later.

The inner liner 17 may thus be thickened to improve the effect of attenuating tire vibration in the cross-sectional primary vibration mode. Thus, the inner liner 17 of at least 1.5 mm thick may be disposed as described above, so as to suppress vibration in the cross-sectional primary vibration mode which may otherwise constitute a major cause of tire noise, to thereby achieve reduction of in-vehicle noise of 80 Hz to 100 Hz in the pneumatic tire 10. Further, among the components of the tire, the inner liner 17 alone is thickened, which prevents the carcass line from being affected as the inner liner 17 is disposed on the inside of the carcass 15. Further, the inner liner is an existing tire member, which means that noise reduction can be achieved without increasing the number of members.

Meanwhile, in the current tire products development, the inner liner is generally required to be reduced in thickness, within a range satisfying the required air permeability, in order to suppress loss to occur in the inner liner and to improve rolling resistance.

In the process of designing the disclosed tire, it was also anticipated that the rolling resistance may increase due to the thickened inner liner. However, according to a narrow-width, large-diameter tire, in which the sectional width SW and the outer diameter OD of the pneumatic tire 10 have the aforementioned correlation, when the tread portion 14 contacts the ground, tire widthwise deformation is suppressed, and eccentric deformation is suppressed. Therefore, as compared to a normal-sized tire, according to a narrow-width, large-diameter tire, in which the sectional width SW and the outer diameter OD have the aforementioned correlation, the inner liner can be thickened while suppressing increase in rolling resistance resulting from the increase of loss in the inner liner Further, in this embodiment, the thickness of the inner liner 17 is defined to be 2.8 mm or less.

The aforementioned use of the inner liner 17 of 2.8 mm thick or less sets an upper limit on the weight of the inner liner 17, allowing for reliably suppressing increase in rolling resistance.

Here, from the same perspective as above, the inner liner 17 may more preferably have a thickness of 1.6 mm or more and 2.4 mm or less, and further preferably of 1.8 mm or more and 2.2 mm or less.

Further, in this embodiment, the inner liner 17 is increased in thickness at least in part of the side portion 18 as compared to in the rest of the inner liner 17 (see FIG. 1). Here, the section of the inner liner 17 in the side portion 18 refers to a section starting from the tire-radial inner end of the bead portion 11 to the tire-widthwise end where the tire-widthwise belt end of the inclined belt 16 is arranged, on the inner surface side of the side portion 18. For example, on the further inside of the first inner liner rubber 19 having a uniform thickness, the second inner liner rubber 20 may further be disposed as another inner liner rubber, to thereby increase the thickness of the inner liner 17 at least in part of the side portion 18, as compared with the thickness thereof in the rest of the inner liner 17.

In the aforementioned configuration, the inner liner 17 is further thickened only in a portion that largely contributes to suppressing tire vibration in the sectional first-order vibration mode, which can further reduce noise while suppressing increase in weight of the inner liner 17.

Further, in this embodiment, a rubber composition forming the inner liner 17 has an air permeability coefficient of $1.0 \times 10^{-14}$ cc·cm/(cm$^2$·s·cmHg) or more and $6.5 \times 10^{-10}$ cc·cm/(cm$^2$·s·cmHg) or less. This configuration allows for suppressing increase in weight and production cost while keeping the high air barrier property of the inner liner 17 and maintaining high the internal pressure of the tire.

Further, in this embodiment, the inner liner 17 is formed of a rubber composition with a dynamic storage elastic modulus E' at −40° C. of 500 MPa or higher and 8000 MPa or lower. This configuration allows for providing sufficient moldability in the tire while preventing cracking of the inner liner 17 at low temperature.

Further, in this embodiment, the rubber composition forming the inner liner 17 has a loss tangent (tan δ) of 0.1 or more and 0.3 or less. This configuration allows for maintaining elasticity and for suppressing loss increase.

Further, in this embodiment, the inner liner 17 may have a uniform thickness as a whole. Further, in this embodiment, the inclining belt 16 is formed of two inclined belt layers having cords crossing each other and inclined with respect to the tire equator plane CL.

The tire size of the pneumatic tire 10 of this embodiment may be specifically exemplified as: 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R1, 155/55R19, 155/55R21, 155/60R17, 155/65R13, 155/65R18, 155/70R17, 155/70R19, 165/45R22, 165/55R16, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 175/65R15, 185/45R22, 185/50R16, 185/50R20, 185/55R19, 185/55R20, 185/60R17, 185/60R19, 185/60R20, 195/50R20, 195/55R20, 195/60R19, 195/65R17, 205/50R21, 205/55R16, 205/55R20, 205/60R16, 205/60R18, 215/50R21, 215/60R17, 225/65R17.

The pneumatic tire 10 of this embodiment may preferably be used with high internal pressure. Specifically, the tire 10 may preferably have an internal pressure of 250 kPa or higher. The tire with the internal pressure of 250 kPa or higher can suppress increase of the contact length, which is otherwise likely to increase, to thereby reduce the amount of deformation of the tread rubber and further reduce the rolling resistance.

Here, in the pneumatic tire 10 of this embodiment, the amount of grooves in the tread may preferably be reduced in consideration of the balance between the wet performance and other performances. Specifically, the groove volume ratio (groove volume V2/tread rubber volume V1) may preferably be 20% or less, and the negative ratio (the ratio of the groove area to the tread surface area) may preferably be 20% or less. Those values are smaller than standard values in a pneumatic tire of a conventional size.

Figure 3A:
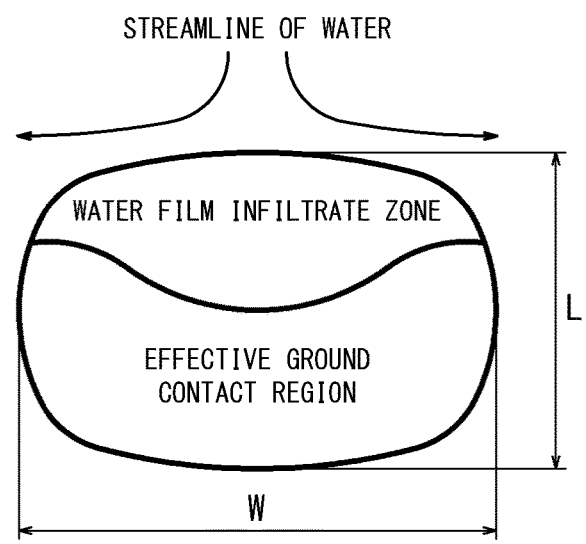
FIG. 3A is for illustrating the wet performance of a wide tire.
Figure 3B:
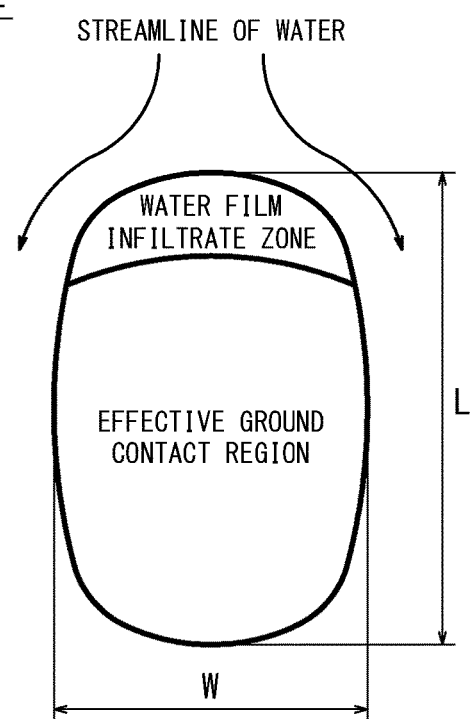
FIG. 3B is for illustrating the wet performance of a narrow tire.

A general idea provides that the groove amount should be increased to improve wet performance. However, as illustrated in FIG. 3B by comparison with FIG. 3A, the pneumatic tire 10 of this embodiment, which is in a narrow-width, large-diameter size, is reduced in the contact surface width W, which allows water to be readily drained in the tire width direction. This means that the groove amount can be reduced without impairing the wet performance; rather, the land portion rigidity is improved, which leads to improving other performances such as cornering power.

Here, the groove volume ratio is defined as the ratio of V2/V1, in which V1 represents the volume of the tread rubber disposed on the tire widthwise inner side than the both ends in the width direction of a maximum width inclined belt layer having the maximum width in the tire width direction of the inclined belt layers forming the inclined belt 16, while being on the tire radial outer side than a reinforcing member 21 on the tire radial outermost side at the tire widthwise center position, and V2 stands for the total volume of grooves formed in the tread surface.

Figure 4:
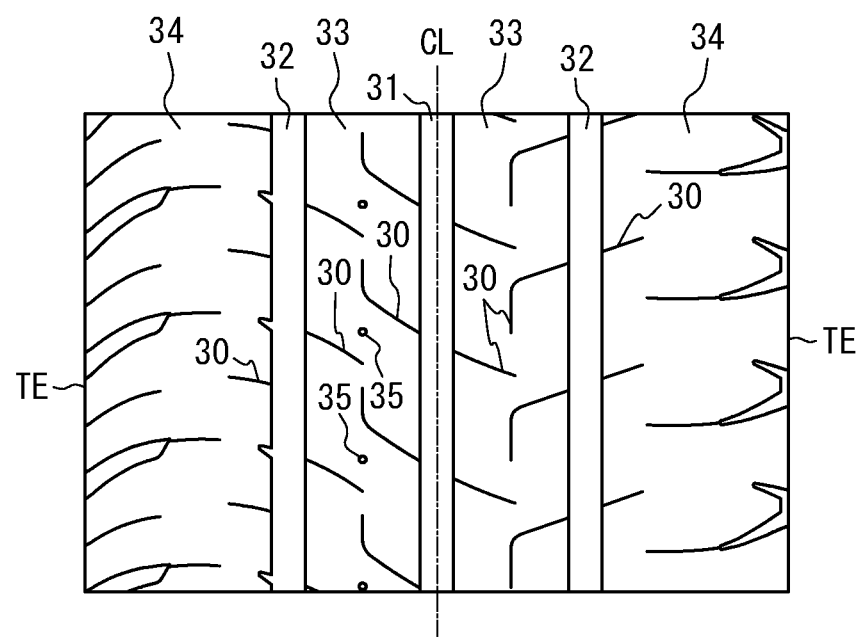
FIG. 4 is a development elevation illustrating a first example of a tread pattern of the disclosed tire according to an embodiment.

The pneumatic tire 10 of this embodiment may preferably have a tread pattern, for example, as illustrated in the example of FIG. 4, mainly composed of rib-like land portions 33, 34 which are each partitioned in the tire width direction by two circumferential grooves 31, 32 or by the circumferential groove 32 and a tread end TE. Here, the rib-like land portions 33, 34 refer to land portions extending in the tire circumferential direction without having any widthwise grooves traversing in the tire width direction. However, the rib-like land portions 33, 34 may include sipes and other widthwise grooves terminating within the rib-like land portions. This is in contrast to a standard pneumatic tire of a conventional size which often employs a pattern having widthwise grooves for improving wet performance.

This can be considered attributable to that the pneumatic tire 10 of this embodiment is narrow in the contact width and has a high contact pressure particularly in the use under a high internal pressure (of, for example, 250 kPa or more), and thus, grounding performance on a wet road can be improved when circumferential shearing rigidity is increased.

As illustrated in the example of FIG. 4, in a tread pattern mainly composed of the rib-like land portions 33, 34, the tread pattern may include only the rib-like land portions (that is, with no widthwise groove) in tire widthwise region accounting for 80% of the tread width TW, with the tire equator plane CL being the center. The reason is that the drainage performance in this tire widthwise region significantly contributes to wet performance in particular.

Here, the "tread end TE" refers to the outermost position in the tire width direction in a region across the entire region in the tire circumferential direction of the contact surface which comes into contact with a road surface, in a tire mounted on a rim and filled with an internal pressure prescribed for each vehicle onto which the tire is to be mounted, and applied with a maximum load prescribed in the aforementioned industrial standards or to be determined in the future, or a load to be applied to a tire to be placed under the largest load among the four tires with the maximum number of passengers assumed in the case where the size is not recited in the aforementioned industrial standards.

The "industrial standards" refer to industrial standards effective in a region where the tire is used, for example, JATMA YEAR BOOK published by the Japan Automobile Tire Manufacturers Association, Inc. (JATMA) in Japan, in STANDARDS MANUAL of the European Tire and Rim Technological Organization (ETRTO) in Europe, and in YEAR BOOK of the Tire and Rim Association, Inc. (TRA) in the US.

The "internal pressure prescribed for each vehicle onto which the tire is to be mounted" refers to an air pressure prescribed in the aforementioned industrial standards or corresponding to the maximum applied load to be determined in future, and when the size is not recited in the aforementioned industrial standards, an air pressure corresponding to the load to be applied to a tire to be placed under the largest load among the four tires with the maximum number of passengers assumed.

The "tread width TW" refers to a distance between the tread ends TE in the tire width direction.

Further, as illustrated in FIG. 4, sipes 30 may be provided on the tread surface, so as to improve various performances.

In particular, in terms of improving wet performance, the sipes 30 each may preferably be a one-side opening sipe 30 which opens at one end thereof to the groove while terminating at the other end thereof within the land portion. The one-side opening sipes 30 can increase circumferential shearing rigidity compared with both-side opening sipes while removing water films in the contact surface by means of the one-side opening sipes 30, to thereby produce an effect of improving wet performance resulting from the improvement in circumferential shearing rigidity. For the same reason, the one-side opening sipes 30 may preferably be combined with a pattern mainly composed of the rib-like land portions 33, 34, as illustrated in FIG. 4.

Figure 5:
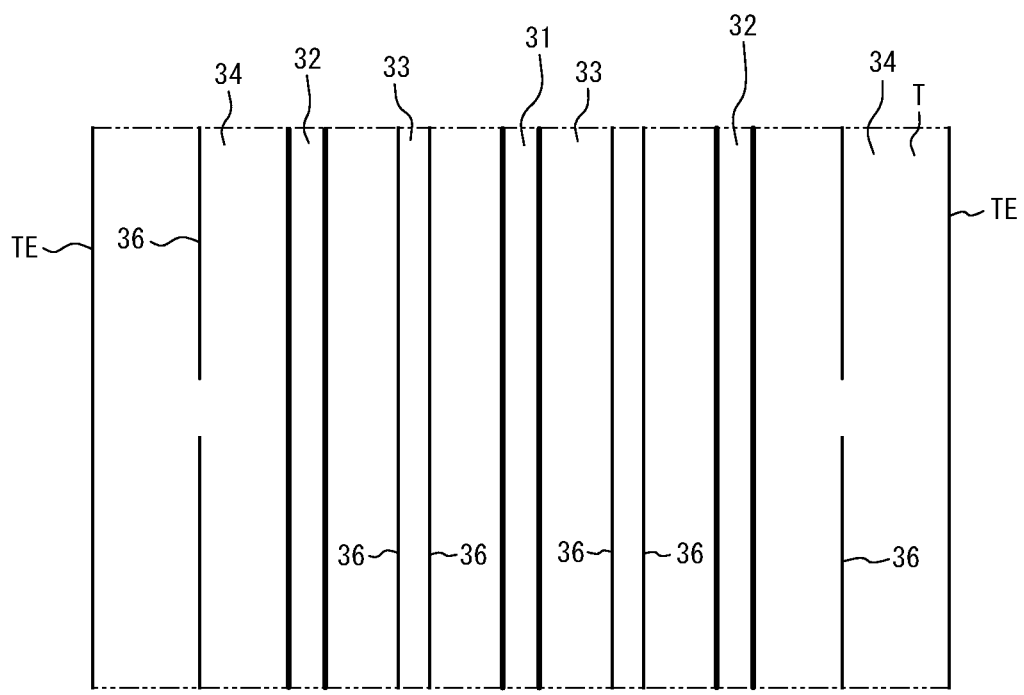
FIG. 5 is a development elevation illustrating a second example of a tread pattern of the disclosed tire according to an embodiment.

In the pneumatic tire 10 of this embodiment, in view of further improving wet performance, small holes 35 illustrated in FIG. 4 or a circumferential sipes 36 illustrated in FIG. 5 may preferably be provided in the tread surface when the tread rubber uses high rigidity rubber. The use of high rigidity rubber increases circumferential shearing rigidity, which accelerates draining of water. On the other hand, however, the effective ground contact area between the tire and the road surface may decrease to depress wet performance. In light thereof, circumferential sipes and/or small holes which reduce the compression rigidity of the rubber may be used, to thereby suppress compression rigidity of the rubber to increase the effective ground contact area. Here, the small holes 35 and/or the circumferential sipes 36 have an effect of reducing the circumferential shearing rigidity, which however is sufficiently small enough to maintain the wet performance improving effect resulting from the improvement in circumferential shearing rigidity.

Here, in this embodiment, in the case where the mounting direction of the tire 10 with respect to the vehicle (vehicle-mounted direction) is designated, difference may be provided to the negative ratio between the tire widthwise half portions on the inside and outside in the vehicle-mounted direction, which boarder at the tire equator plane CL.

Figure 6:
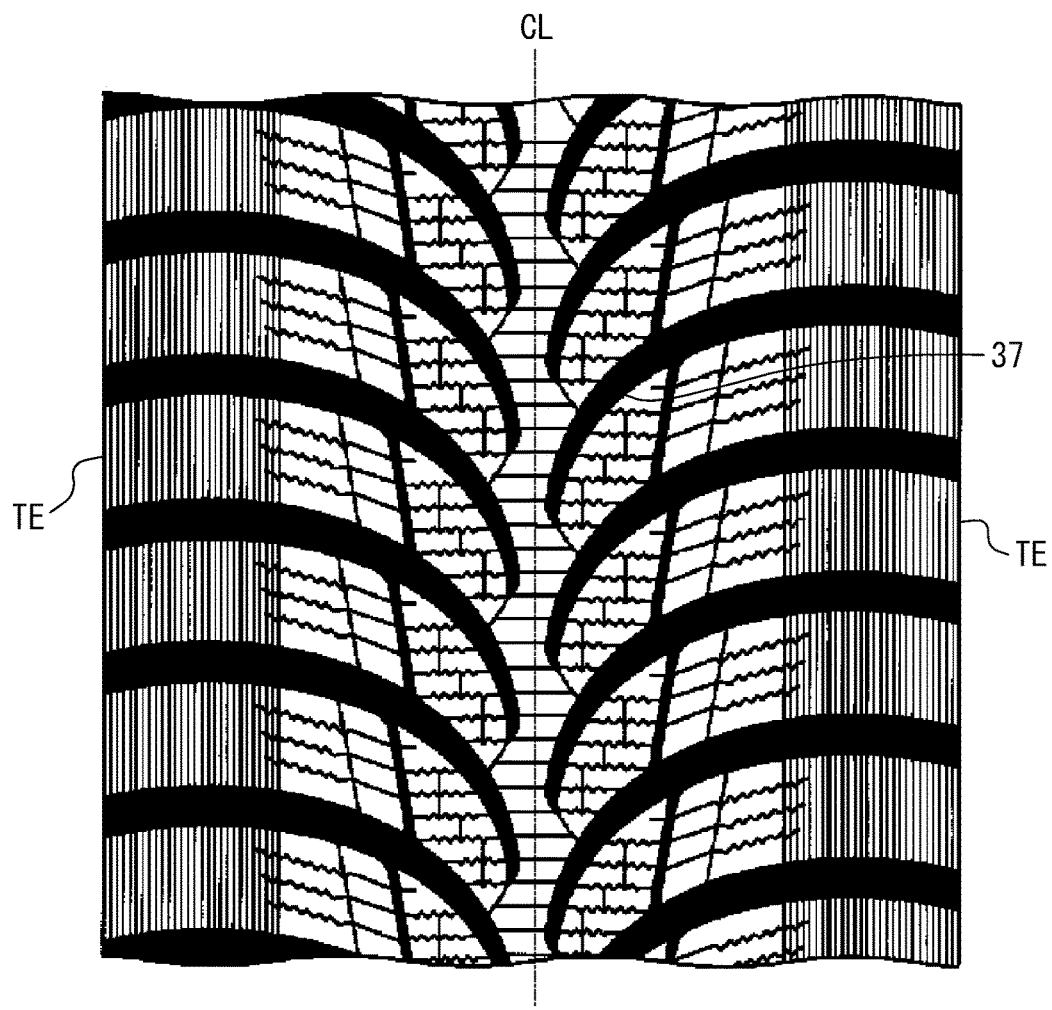
FIG. 6 is a development elevation illustrating a third example of a tread pattern of the disclosed tire according to an embodiment.

In this embodiment, as illustrated in the example of FIG. 6, the tread pattern may be configured to have a widthwise groove 37 extending from the vicinity of the tire equator plane CL to the tread end TE. In this case, the circumferential groove may optionally be omitted. The tread pattern as exemplified in FIG. 6, which is composed mainly of the widthwise grooves 37, can effectively contribute to on-snow performance in particular.

Figure 7:
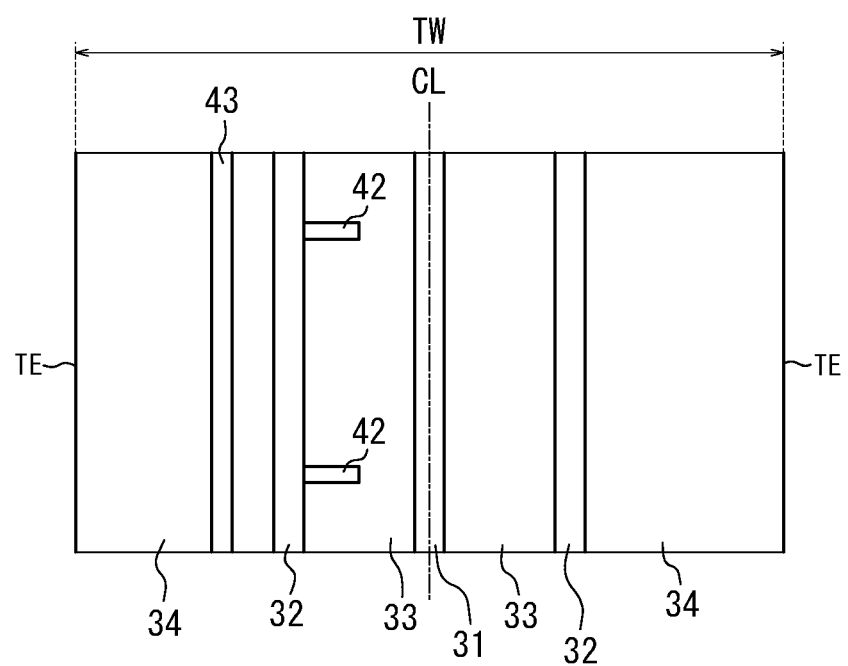
FIG. 7 is a development elevation illustrating a fourth example of a tread pattern of the disclosed tire according to an embodiment.

In this embodiment, of the rib-like land portions 33, 34 illustrated in FIGS. 4, 5, and 7, the shoulder rib-like land portion 34 partitioned by the circumferential groove 32 on the tire widthwise outermost side and the tread end TE may employ various configurations. For example, in a tire for which the vehicle-mounted direction is designated, the shoulder rib-like land portion 34 may be varied in width in the tire width direction between the vehicle-mounted direction outside and inside. Here, in consideration of the steering stability, the shoulder rib-like land portion 34 on the vehicle-mounted direction outside may preferably be larger in width than the shoulder rib-like land portion 34 on the vehicle-mounted direction inside.

In view of suppressing buckling so as to improve cornering power, the pneumatic tire 10 of this embodiment may preferably include, as illustrated in FIG. 7, one-end open grooves 42 each extending from the circumferential groove 32 to the vehicle-mounted direction inside when the tire is mounted on a vehicle. More specifically, the tire 10 may preferably include, on the tread surface, in at least one of the half portions across the tire equator plane CL as the border, the circumferential groove 32 extending in the tire circumferential direction on the tread end TE side, the circumferential groove 32 being adjacent to the tread end TE while being spaced apart from the tread end TE in the tire width direction at a distance by 25% of the tread width TW, and at least one one-end open groove 42, in one of the rib-like land portions 33 adjacent to the shoulder rib-like land portion 34 partitioned by the circumferential groove 42 and the tread end TE, the one-end open groove 42 extending from the circumferential groove 32 on the tread end IF side and extending in the tire width direction to remain within the land portion 33. Here, the groove 43 of FIG. 7 is a shallow groove smaller in groove depth than the circumferential groove 32.

In the case of a narrow-width, large diameter pneumatic tire as in this embodiment, the tire is subjected to compressive stress on the vehicle-mounted direction outside while subjected to tensile stress on the vehicle-mounted direction inside. The stresses cause deformation in the tread rubber, which deforms the belt so as to in advertently raise the contact surface off the ground.

Here, the tire has the one-end open groove 42 extending from the circumferential groove 32 on the tread end TE side to remain within the rib-like land portion 33. Thus, the tire is structured, on the vehicle-mounted direction outside within the rib-like land portion 33, to have the one-end open groove 42 closed under compressive stress, which can suppress deformation of the tread and belt under compressive stress, as compared with the case where the one-end open groove 42 is not provided or the one-end open groove 42 is not extended to the vehicle-mounted direction outside.

Further, the one-end open groove 42 remains within the rib-like land portion 33, and thus, as compared with the case where the one-end open groove 42 extends toward the vehicle-mounted direction inside, the tire is increased in rigidity against tensile stress on the vehicle-mounted direction inside to thereby suppress deformation of the tread and the belt.

In the pneumatic tire 10 of this embodiment, as illustrated in FIG. 1, the distance between the straight line m1 and the straight line m2 in a tire widthwise section is defined as a fall height LCR, which may preferably satisfy the ratio LCR/TW of 0.045 or less, the straight line m1 passing through a point P on the tread surface at the tire equator plane CL while being parallel to the tire width direction, the straight line m2 passing through the tread end TE while being parallel to the tire width direction. With the ratio LCR/TW being defined to fall within the aforementioned range, the tire 10 has a crown portion flattened (planarized) to increase the contact area, alleviating an input (pressure) from the road surface to reduce the deflection rate in the tire radial direction, to thereby improve the tire in durability and wear resistance.

In the pneumatic tire 10 of this embodiment, a highly-elastic rubber may preferably be used as the tread rubber in terms of improving wet performance. This is in contrast with a pneumatic tire in a conventional size which rather uses a low-elastic rubber to improve wet performance. A conceivable reason is that the pneumatic tire 10 of this embodiment, which is in a narrow-width, large-diameter size, has a narrow contact width and also has a high contact pressure in use with high internal pressure in particular, which may increase circumferential shearing rigidity, to thereby improve grounding performance on a wet road.

The highly-elastic rubber may preferably have a dynamic storage elastic modulus E' at 30° C. specifically in a range of 6.0 MPa to 12.0 MPa. The use of rubber satisfying the range may further improve wet performance in the pneumatic tire 10. Further, the tread rubber may preferably have the loss tangent tan δ at 60° C. falling within a range of 0.05 to 0.15. The tread rubber satisfying the range may further reduce rolling resistance.

In this embodiment, in addition to the tread rubber using the aforementioned highly-elastic rubber, a tread pattern mainly composed of the rib-like land portions 33, 34 illustrated in FIGS. 4, 5, and 7 may be used to further increase the circumferential shearing rigidity, to thereby improve wet performance.

In the tire 10 of this embodiment, the tread rubber may be formed of a plurality of different rubber layers laminated in the tire radial direction. Rubbers for use as the aforementioned plurality of rubber layers may be different from one another in such properties as tangent loss, modulus, hardness, glass transition temperature, and material. Further, the ratio of thickness in the tire radial direction of the plurality of rubber layers may vary in the tire width direction. Alternatively, the groove bottom of the circumferential grooves 31, 32 (FIG. 1), for example, may alone be formed of a rubber layer different from the surroundings.

In this embodiment, the tread rubber may be formed of a plurality of rubber layers different from one another in the tire width direction. Rubbers for use as the aforementioned plurality of rubber layers may be different from one another in such properties as tangent loss, modulus, hardness, glass transition temperature, and material. Further, the ratio of thickness in the tire radial direction of the plurality of rubber layers may vary in the tire radial direction. Alternatively, rubber layers in a limited region, such as in the vicinity of the circumferential grooves 31, 32 alone, the vicinity of the tread end TE alone, the vicinity of the shoulder land portion 34 alone, or the vicinity of the center land portion 33 alone may be formed of rubber layers different from the surroundings (FIG. 1).

In the tire 10 of the present embodiment, the number of the inclined belt layers forming the inclined belt 16 may be only one. However, if only one inclined belt layer constitutes the inclined belt 16, the shape of the ground contact surface at time of cornering is likely to be distorted. Therefore, the inclined belt 16 is preferably formed of two or more inclined belt layers, each having cords intersecting with the cords of other layers. In the pneumatic tire 10 of the present embodiment, according to the example of FIG. 1, the inclined belt 16 is most preferably formed of two inclined belt layers.

According to the tire 10 of this embodiment, the tire widthwise width of a widest inclined belt layer having the largest tire widthwise width among the inclined belt layers forming the inclined belt 16 may preferably be 90% to 115% of the tread width TW, and particularly preferably be 100% to 105% of the tread width TW.

In this embodiment, metal cords, in particular, steel cords are the most typical examples of belt cords for use in the inclined belt layers constituting the inclined belt 16. However, organic fiber cords may also be used. The steel cords may include steel as a main component, and also contain various micro inclusions such as carbon, manganese, silicon, phosphorous, sulfur, copper, and chromium.

In this embodiment, belt cords for use in the inclined belt layers constituting the inclined belt 16 may use monofilament cords and cords obtained by twisting a plurality of filaments. Various designs may be adopted for the twist structure, which may be different in, for example, sectional structure, twist pitch, twist direction, distance of adjacent filaments. Further, cords obtained by twisting filaments of different materials may also be used, which may employ various twist structures such as single twist, layer twist, and a multi twist without being limited to any particular sectional structure.

In the present embodiment, the inclination angle of the belt cords of the inclined belt layer constituting the inclined belt 16 is preferably 10° or more with respect to the tire circumferential direction.

In the present embodiment, the inclination angle of the belt cords of the inclined belt layer constituting the inclined belt 16 is preferably set to a large angle, specifically, preferably 35° or more with respect to the tire circumferential direction, and in particular, in the range of 55° to 85° with respect to the tire circumferential direction.

By setting the inclination angle to 35° or more, it is possible to increase the rigidity with respect to the tire width direction, and in particular, improve the steering stability at the time of cornering. Moreover, it is possible to reduce shearing deformation of the rubber between layers, and to improve the rolling resistance.

Figure 8:
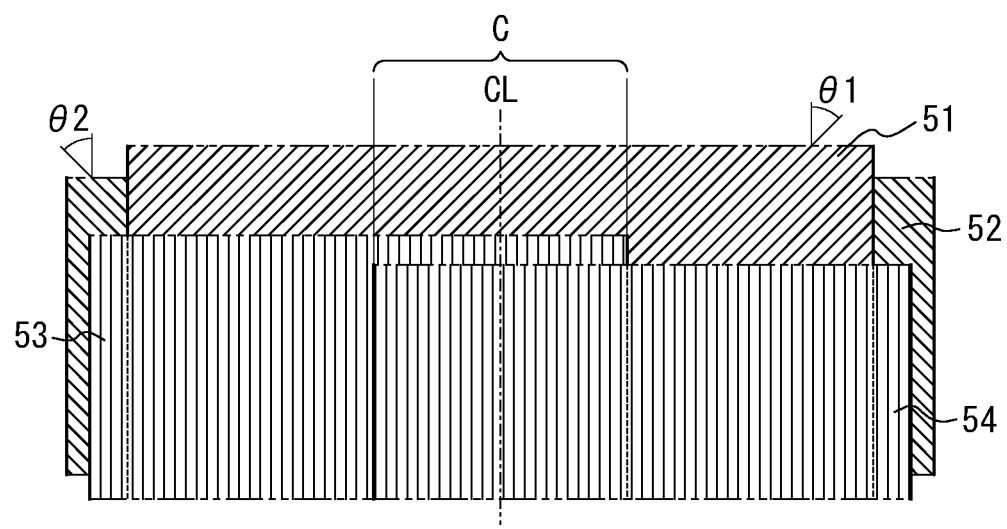
FIG. 8 illustrates a schematic plan view of a first example of a belt structure of a tire according to an embodiment.

As illustrated in FIG. 8, the tire 10 of the present embodiment can have a circumferential belt formed of one or more circumferential belt layers 53, 54 on a tire radial outer side of inclined belt layers 51, 52 constituting the inclined belt 16. In the example of FIG. 8, two circumferential belt layers 53, 54 overlap with each other in the tire radial direction.

In a case where inclination angles θ1, θ2 with respect to the tire circumferential direction of the belt cords of the inclined belt layers 51, 52 are 35° or more, in the circumferential belts 53, 54, the tire circumferential rigidity per unit width of a central region C inclusive of the tire equator plane CL is preferably higher than the tire circumferential rigidity per unit width of the other regions. For example, by setting the number of circumferential belt layers 53, 54 in the central region C higher than the other regions, the tire circumferential rigidity per unit width of the central region C can be higher than the tire circumferential rigidity per unit width of the other regions.

As in the example of FIG. 8, many tires having belt cords in the inclined belt layers 51, 52 that are inclined at 35° or more with respect to the tire circumferential direction tend to be deformed such that the entire tread surface greatly vibrates within a high frequency range of 400 Hz to 2 kHz, in cross-sectional primary, secondary and tertiary vibration modes, and thus generate loud emission sound. Thus, by locally increasing the tire circumferential rigidity of the tire widthwise central region of the tread portion 13, the tire widthwise central region C of the tread portion 13 becomes harder to be expanded in the tire circumferential direction, whereby expansion of the tread surface in the tire circumferential direction can be suppressed. As a result, it is possible to reduce the emission sound.

Further, as mentioned above, in a tire having increased tire circumferential rigidity in the central region C inclusive of the tire equator plane CL, the tread portion 13 preferably has a rib-like land portion continuous in the tire circumferential direction in a region in the tread surface inclusive of at least the tire equator plane CL. By arranging circumferential grooves on the tire equator plane CL or in its vicinity, there is a probability that the rigidity of the tread within the region is reduced and the contact length at the land portion partitioning the circumferential grooves becomes extremely short. Thus, from the viewpoint of improving noise performance without reducing cornering power, it is preferable to arrange a rib-like land portion continuous in the tire circumferential direction over a certain region inclusive of the tire equator plane CL.

Figure 9:
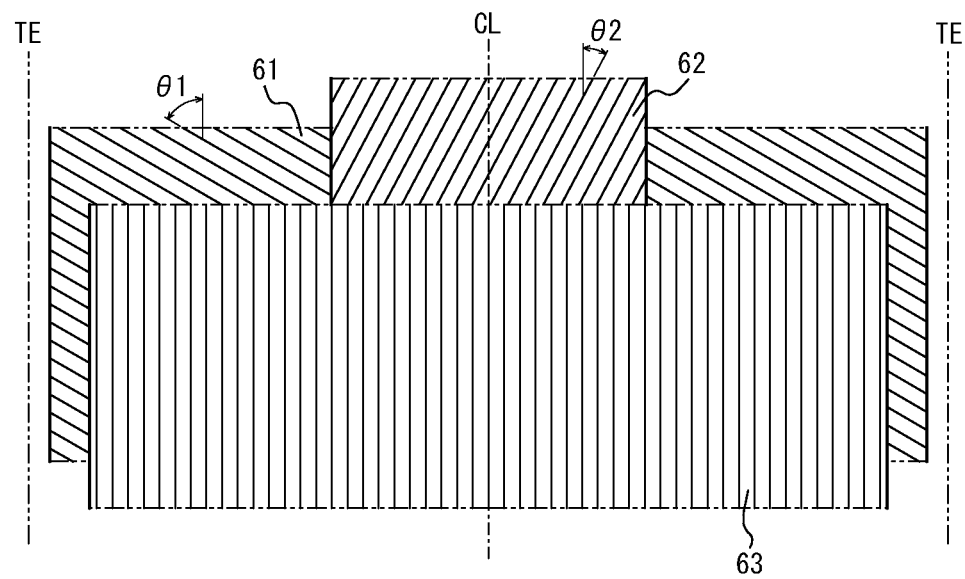
FIG. 9 illustrates a schematic plan view of a second example of a belt structure of a tire according to an embodiment.

FIG. 9 schematically illustrates another example of the belt structure, in which one circumferential belt layer 63 is laminated on the tire radial outer side of two inclined belt layers 61, 62.

In the present embodiment, as in the example illustrated in FIG. 9, in a case where the inclination angle of the belt cords of at least one inclined belt layer 61 is 35° or more, it is preferable that at least two inclined belt layers 61, 62 having different tire widthwise width are provided, and the inclination angle θ1 of cords in the widest inclined belt layer 61 with respect to the tire circumferential direction and the inclination angle θ2 of the cords in the narrowest inclined belt layer 62 with respect to the tire circumferential direction satisfy 35°≤θ1≤85°, 10°≤θ2≤30°, and θ1>θ2.

As in the example of FIG. 9, many tires having an inclined belt layers 61 including belt cords that are inclined at 35° or more with respect to the tire circumferential direction tend to be deformed such that the entire tread surface greatly vibrates within a high frequency range of 400 Hz to 2 kHz, in cross-sectional primary, secondary and tertiary vibration modes, and thus generate loud emission sound. Thus, by locally increasing the tire circumferential rigidity of the tire widthwise central region of the tread portion 13, the tire widthwise central region of the tread portion 13 becomes harder to be expanded in the tire circumferential direction, whereby expansion of the tread surface in the tire circumferential direction can be suppressed. As a result, it is possible to reduce the emission sound.

Figure 10:
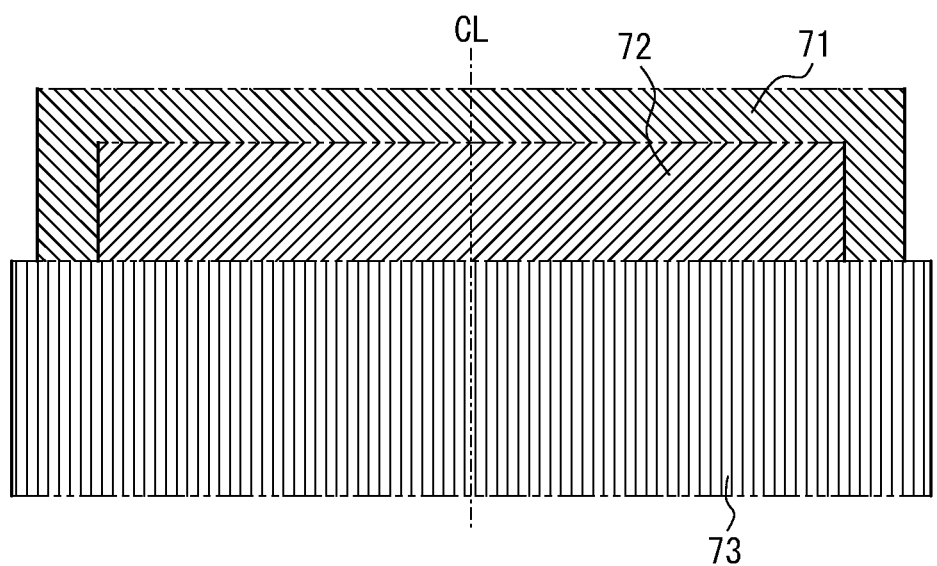
FIG. 10 illustrates a schematic plan view of a third example of a belt structure of a tire according to an embodiment.

FIG. 10 schematically illustrates another example of the belt structure, in which a single-layered circumferential belt layer 73 is laminated on the tire radial outer side of two inclined belt layers 71, 72.

In the pneumatic tire 10 of this embodiment, the circumferential belt layers 53, 54, 63, 73 of FIGS. 8 to 10 may preferably be highly rigid, and more specifically, may preferably be formed of a rubberized layer of cords extending in the tire circumferential direction, which may preferably satisfy 1500≥X≥750 where X is defined as X=Y×n×m, Y representing the Young's modulus (GPa) of the cords, n representing the number of the cords (cords/50 mm), m representing the number of the circumferential belt layers 53, 54, 63, 73. The pneumatic tire 10 of this embodiment which is in a narrow-width, large-diameter size, is apt to be in a shape which is subjected to local deformation in the tire circumferential direction against input from the road surface upon cornering, such that the grounding surface is likely to be in a substantially triangular shape, that is, the contact length in the circumferential direction is largely changed depending on the position in the tire width direction. In contrast, the circumferential belt layers 53, 54, 63, 73 are formed to have high rigidity, so as to improve ring rigidity of the tire, which suppresses deformation in the tire circumferential direction, with the result that deformation in the tire width direction may also be suppressed by the incompressibility of the rubber, making the grounding shape unlikely to change. Further, the improved ring rigidity promotes eccentric deformation, which simultaneously improves rolling resistance. The effect of improving rolling resistance is particularly improved extensively in the pneumatic tire 10 of this embodiment.

Further, when the highly rigid circumferential belt layers 53, 54, 63, 73 are used as described above, belt cords of the inclined belt layers 51, 61, 71, 72 may preferably be inclined relative to the tire circumferential direction at a high angle, specifically, of at least 35°. The use of the highly rigid circumferential belt layers 53, 54, 63, 73 increases rigidity in the tire circumferential direction, which may inadvertently reduce the contact length in some tires. In light thereof, belt layers inclined at a high angle may be used to reduce the out-of-plane flexural rigidity in the tire circumferential direction to increase the stretching of the rubber in the tire circumferential direction upon tread surface deformation, to thereby suppress reduction in contact length.

Further, in this embodiment, waved cords may be used for the circumferential belt layers 53, 54, 63, 73, in order to increase breaking strength. The breaking strength may similarly be increased by using high-elongation cords (for example, with the elongation at break of 4.5% to 5.5%).

Further, in this embodiment, various materials may be adopted as the circumferential belt layers 53, 54, 63, 73, as typically exemplified by rayon, nylon, polyethylene naphthalate (PEN), polyethylene terephthalate (PET), aramid, glass fiber, carbon fiber, steel, and the like, with organic fiber cords being particularly preferred in terms of weight reduction.

Here, in this embodiment, the circumferential belt layers 53, 54, 63, 73 may adopt, as the cords thereof, monofilament cords, cords obtained by twisting a plurality of filaments, or hybrid cords obtained by twisting filaments of different materials.

Further, in this embodiment, the number of cords of the circumferential belt layers 53, 54, 63, 73 may be in a range of 20 to 60 per 50 mm, without being limited thereto.

Further, in this embodiment, the circumferential belt layers 53, 54, 63, 73 may be provided with distributions in the tire width direction in terms of such properties as rigidity, material, the number of layers, the density of the cords. For example, the number of the circumferential belt layers 53, 54, 63, 73 may be increased, for example, only at the tire widthwise end. On the other hand, the number of the circumferential belt layers 53, 54, 63, 73 may be increased only in the center portion.

Further, in this embodiment, the circumferential belt layers 53, 54, 63, 73 may be designed to be wider or narrower than the inclined belt layers 51, 52, 61, 62, 71, 72. For example, the circumferential belt layers 53, 54, 63, 73 may be designed to have a width in a range of 90% to 110% of the width of the widest inclined belt layers 52, 61, 71 largest in the tire widthwise width among the inclined belt layers 51, 52, 61, 62, 71, 72.

Here, the circumferential belt layers 53, 54, 63, 73 may be configured as spiral layers, which is particularly advantageous in terms of production.

Here, in this embodiment, the circumferential belt layers 53, 54, 63, 73 may optionally be omitted.

In this embodiment, the carcass line may adopt various structures.

For example, the carcass 15 may have a carcass maximum width position in the tire radial direction, which may be closer to either of the bead portion 11 side or the tread portion 13 side. For example, the carcass maximum width position in the tire radial direction of the carcass 15 may be disposed on the tire radial outer side from the bead base portion, within a range of 50% to 90% of the tire section height.

Further, in this embodiment, the carcass 15 may also employ various structures. For example, the number of carcass cords constituting the carcass 15 may be in a range of 20 to 60 per 50 mm, without being limited thereto.

Figure 11:
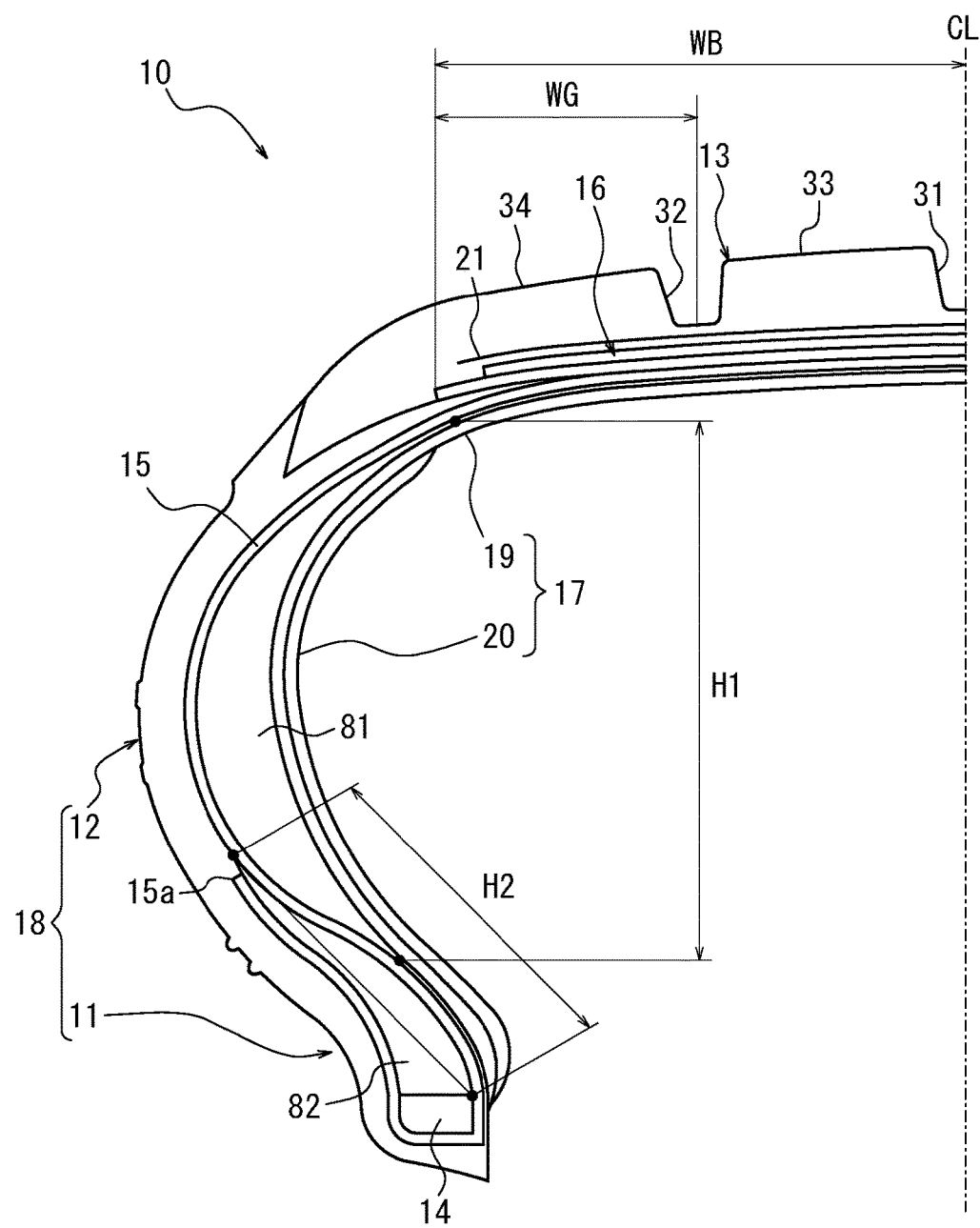
FIG. 11 is a partial sectional view in the tire width direction of the disclosed tire according to an embodiment, when the disclosed tire is a run flat tire.

Furthermore, for example, as illustrated in FIG. 11, the carcass 15 may have a folded end 15a positioned on the tire radial inner side relative to the tire radial end of a bead filler 82. Alternatively, the carcass folded end 15a may be positioned on the tire radial outer side relative to the tire radial outer side end of the bead filler 82 or the tire maximum width position in the tire radial direction, or may be extended, in some cases, to the tire widthwise inner side relative to the tire widthwise end of the inclined belt 16. Further, in the case where the carcass 15 is formed of a plurality of carcass ply layers, the folded ends of the carcass plies may be disposed at different positions in the tire radial direction. Alternatively, the carcass 15 may not include the carcass folded part in the first place; instead, the carcass 15 may be structured to be inserted between a plurality of bead core members, or wound around the bead core 14.

In the pneumatic tire 10 of this embodiment, the side portion 18 may preferably be reduced in thickness. "The side portion 18 may be reduced in thickness" in such a manner that, for example, the bead filler 82 may be configured to have a tire widthwise sectional area S1 which is 1 times or more and 4 times or less of the tire widthwise sectional area S2 of the bead core 14. Further, the sidewall portion 12 may have a gauge Ts at the tire maximum width position in the tire radial direction, and the bead core 14 may have a bead width Tb at the tire radial center position, with the ratio of Ts to Tb (Ts/Tb) falling within a range of 15% or more and 40% or less. Further, the sidewall portion 12 may have a gauge Ts at the tire maximum position in the tire radial direction, and the carcass 15 may have a carcass cord with a diameter Tc, with the ratio of Ts to Tc (Ts/Tc) being 5 or more and 10 or less.

The gauge Ts is a total thickness of all the members including rubber, the carcass 15, and the inner liner 17. Further, when the tire is structured to have the bead core 14 divided into a plurality of small bead cores by the carcass 15. Tb refers to the distance between the widthwise innermost end and the outermost end portion of all the small bead cores.

In this embodiment, the tire 10 may have the tire maximum width position in the tire radial direction disposed in a range of 50% to 90% of the tire section height, on the tire radial outer side from the bead base portion.

The tire 10 of this embodiment may be structured to include a rim guard.

The tire 10 of this embodiment may be structured without optionally including the bead filler 82.

According to this embodiment, the bead core 14 may employ various structures including a cross-sectional circular shape or cross-sectional polygon shape.

In this embodiment, the bead portion 11 may further include, for example, a rubber layer and a cord layer for reinforcement purposes. These additional members may be disposed in various positions with respect to the carcass 15 and the bead filler 82.

In the present embodiment, the inner liner 17 can be formed of a rubber layer mainly containing butyl rubber, as well as a film layer containing resin as a main component.

In this embodiment, in order to reduce cavity resonance, the tire inner surface may include a porous member arranged thereon or may be treated with an electrostatic flocking process.

The tire 10 of this embodiment may optionally include, on the tire inner surface, a sealant member for preventing air leakage upon a blowout of the tire.

The pneumatic tire 10 of this embodiment may optionally be configured as a side reinforced run flat tire having a side reinforcing rubber 81 having a crescent section disposed on the side portion 18 as illustrated in FIG. 11.

As in the example of FIG. 11, in the pneumatic tire 10 of this embodiment, the side portion 18 may be simplified in structure when configured as a side reinforced run flat tire, to thereby realize both the run flat durability and the fuel efficiency. This is based on the finding that, in the case of a pneumatic run flat tire in a narrow-width, large-diameter size, the tire undergoes, during run-flat traveling, relatively small deformation in the side portion 18 and the tread portion 13 but goes through relatively large deformation from the shoulder portion to the buttress portion. Such deformation is in contrast to that a conventional size tire undergoes relatively large deformation in the side portion. Such deformation unique to a narrow-width, large-diameter tire allows the tire to have a simplified structure to sufficiently ensure run flat durability and can also improve further the fuel efficiency.

Specifically, at least any one of the following conditions (i) to may be satisfied, to thereby simplify the tire in structure.

(i) As illustrated in FIG. 11, the folded end 15a of the carcass folded part of the carcass 15 is positioned on the tire radial inner side than the tire maximum width position of the tire 10 in the tire radial direction.

(ii) The tire 10 in a reference state as being assembled to a rim and filled with a predetermined internal pressure with no load applied thereon satisfies a relation of $1.8 \leq H1/H2 \leq 3.5$, where H1 represents the tire radial maximum length of the side reinforcing rubber 81 in a tire widthwise section and H2 represents the length of a line segment connecting the tire radial outermost point of the bead filler 82 and the tire radial outermost point of the bead core 14. Here, as in the example of FIG. 11, when there are a plurality of line segments having the lengths H2 connecting the tire radial outermost point of the bead filler 82 and the tire radial outermost point of the bead core 14, the maximum one is used as the length 112.

(iii) The tire satisfies the relation of $10 \text{ (mm)} \leq (SW/OD) \times H1 \leq 20 \text{ (mm)}$.

According to the pneumatic tire 10 of this embodiment, when the tire is configured as a side reinforced run flat tire as illustrated in FIG. 11, the circumferential groove 32 on the tire widthwise outermost side is arranged closer to the tire equator plane CL in the tire width direction, to thereby realize further improvement in run flat durability. This is based on the finding that, in the case of a pneumatic run flat tire of the example of FIG. 11 of a narrow-width, large-diameter size, the tire undergoes relatively small deformation in the side portion 18 and the tread portion 13 but goes through relatively large deformation from the shoulder portion to the buttress portion during run-flat traveling. Such deformation is in contrast to that a conventional size tire undergoes relatively large deformation in the side portion. As described above, in a narrow-width, large-diameter tire, which undergoes unique deformation, the circumferential groove 32 on the tire widthwise outermost side may be arranged closer to the tire equator plane CL, to thereby increase grounding performance from the shoulder land portion to the buttress portion in run-flat traveling, which alleviates the contact pressure. As a result, the tire can further be improved in run flat durability.

Specifically, the tire in a reference state as being assembled to a rim and filled with a predetermined internal pressure with no load applied thereon may preferably satisfy the relation of $0.5 \leq WG/WB \leq 0.8$, where WB represents the half width in the tire width direction of a belt layer maximum in width in the tire width direction of the one or more belt layers forming the inclined belt 16 and WG represents a tire widthwise distance from the tire widthwise end of a belt layer maximum in width in the tire width direction to the tire widthwise center position of the circumferential groove 32 in the tire widthwise outermost side of the one or more circumferential grooves 31, 32.

EXAMPLES

Next, the disclosed pneumatic tire was prototyped and subjected to performance evaluation on the rolling resistance and the in-vehicle noise, which is described in below. Pneumatic tires with the specifications shown in Table 1 were prototyped as Comparative Examples 1, 2 in the tire size of 195/65R15 (in a normal size, with the section width SW=205 mm, the outer diameter OD=630 mm), and as Comparative Example 3 and Examples 1 to 5 in the tire size of 165/60R19 (in a narrow-width, lame-diameter size, with the section width SW=175 atm, the outer diameter OD=680 min). Pneumatic tires of Comparative Examples 1 to 3 and pneumatic tires of Examples 1 to 5 were evaluated for in-vehicle noise and rolling resistance by the following method. The results are shown in Table 1.

(Evaluation of In-Vehicle Noise Performance)

The tires according to Comparative Examples 1, 2 were each assembled to a rim in a rim size of 6.5J-15 and the tires according to Comparative Example 3 and Examples 1 to 5 were each assembled to a rim in a rim size of 5.5J-19, which were each filled with an internal pressure of 300 kPa, and then rotated on a running test drum under the load of 4.28 kN at 40 km, 60 km, 80 km, 100 km per hour, so as to measure the noise level inside the vehicle, and the average of the measured values was calculated. Table 1 shows the result thereof as the noise variation (dB), with Comparative Example 1 as the reference. The smaller values indicate better performance in each case.

(Evaluation on Rolling Resistance Performance)

The tires according to Comparative Examples 1, 2 were each assembled to a rim in a rim size of 6.5J-15 and the tires according to Comparative Example 3 and Examples 1 to 5 were each assembled to a rim in a rim size of 5.5J-19, which were each filled with an internal pressure of 300 kPa, and measured for rolling resistance of the axle shaft using a drum tester (at the speed of 80 km/h) with a diameter of 1.7 m having an iron surface. The measurement of rolling resistance was carried out with a smooth drum, force method, in compliance with ISO18164. Table 1 shows the result thereof, with the value of the Comparative Example 1 being an index of 100. The smaller values indicate better performance in every case,

TABLE 1

|  |  | Comparative Example 1 | Comparative Example 2 | Comparative Example 3 | Example 1 | Example 2 | Example 3 | Example 4 | Example 5 |
|---|---|---|---|---|---|---|---|---|---|
| Inner Liner Thickness | Position | Entire Region | Entire Region | Entire Region | Entire Region | Entire Region | Entire Region | Entire Region | Under Belt/ from Side Portion to Under Belt |
|  | Thickness (mm) | 1 | 2 | 1 | 1.5 | 2 | 2.8 | 3 | ⅔ |
| Tire size |  | Normal size | Normal size | Narrow-Width, Large-Diameter Size | Narrow-Width, Large-Diameter Size | Narrow-Width, Large-Diameter Size | Narrow-Width, Large-Diameter Size | Narrow-Width, Large-Diameter Size | Narrow-Width, Large-Diameter Size |
| Noise Performance |  | 0 dB | −2 dB | +2 dB | −0.5 dB | −1 dB | −2.5 dB | −3 dB | −2.5 dB |
| Rolling Resistance Performance |  | 100 | 110 | 85 | 88 | 90 | 98 | 101 | 93 |

As shown in Table 1, Comparative Example 2 is improved in noise performance as compared with Comparative Example 1, but reduced in rolling resistance performance. Comparative Example 3 is improved in rolling resistance performance as compared with Comparative Example 1, but reduced in noise performance. On the other hand, Examples 1 to 5 are improved in noise performance as compared with Comparative Example 1, with the rolling resistance performance still being equal to or better than that of Comparative Example 1. Thus, the disclosed pneumatic tire is capable of reducing noise while suppressing potential increase in rolling resistance performance.

REFERENCE SIGNS LIST 10 pneumatic tire
11 bead portion
12 sidewall portion
13 tread portion
14 bead core
15 carcass
15a folded end of the folded part of carcass
16 inclined belt
17 inner liner
18 side portion
19 first inner liner rubber
20 second inner liner rubber
21 reinforcement member
30 sipe
31, 32 circumferential groove
33, 34 rib-like land portion
35 small hole
36 circumferential sipe
37 widthwise groove
42 one-end opening groove
43 shallow groove
51, 52, 61, 62, 71, 72 inclined belt layer
53, 54, 63, 73 circumferential belt layer
81 side reinforcing rubber
82 bead filler
CL tire equator plane
TE tread end

The invention claimed is:

1. A pneumatic tire comprising a tread, an inner liner, a bead core, and a bead filler, wherein:
   a thickness of the inner liner in at least in part of a side portion of the tire is 1.5 mm or more,
   the thickness of the inner liner along an entirety of the side portion is larger than a thickness of other portions of the inner liner,
   when the tire is mounted to a rim, and an internal pressure of 250 kPa or more is applied to the tire,
   in a case where a sectional width SW of the tire is less than 165 mm, a ratio of the sectional width SW to an outer diameter OD of the tire, SW/OD, is 0.26 or less,
   in a case where the sectional width SW of the tire is 165 mm or more, the sectional width SW and the outer diameter OD of the tire satisfy a relation expression OD≥2.135×SW+282.3,
   wherein an aspect ratio of the pneumatic tire is in a range of 45 to 70, and
   wherein a tire widthwise sectional area S1 of the bead filler is between 1 times or more and 4 times or less of a tire widthwise sectional area S2 of the bead core.

2. The pneumatic tire according to claim 1, wherein the inner liner has a thickness of 2.8 mm or less.

3. The pneumatic tire according to claim 1, wherein the tire sectional width SW is in a range of 105 to 225 mm.

4. The pneumatic tire according to claim 1, wherein a rim diameter is in the range of 13 to 23 inches.

5. The pneumatic tire according to claim 1, wherein the outer diameter OD of the tire is in a range of 511.1 to 751.3 mm.

6. The pneumatic tire according to claim 1, wherein the inner liner has an air permeability coefficient of $1.0\times10^{-14}$ cc·cm/(cm²·s·cmHg) or more and $6.5\times10^{-10}$ cc·cm/(cm²·s·cmHg) or less.

7. The pneumatic tire according to claim 1, wherein the pneumatic tire includes a plurality of grooves disposed on the tread,
   wherein the tread has a tread rubber volume V1, and the plurality of grooves have a groove volume V2, and
   a groove volume ratio defined as the groove volume V2/the tread rubber volume V1 is 20% or less.

8. The pneumatic tire according to claim 1, wherein the pneumatic tire includes a plurality of rib-like land portions on the tread, and a plurality of circumferential grooves, and
   the tread includes only the rib-like land portions and circumferential grooves, without any widthwise grooves, in a tire widthwise region accounting for 80% of a tread width TW.

9. The pneumatic tire according to claim 1, wherein a straight line m1 passes through a point P on a surface of the tread at the tire equator plane CL while being parallel to the tire width direction, and a straight line m2 passes through a tread end TE while being parallel to the tire width direction,
a fall height LCR is defined as a distance between m1 and m2,
the pneumatic tire has a tread width TW, and
a ratio LCR/TW is 0.045 or less.

10. The pneumatic tire according to claim 1, wherein the tread comprises a highly-elastic rubber that has a dynamic storage elastic modulus E' at 30° C. in a range of 6.0 MPa to 12.0 MPa.

11. The pneumatic tire according to claim 1, wherein the pneumatic tire comprises a plurality of inclined belt layers forming an inclined belt, and
a tire widthwise width of a widest inclined belt layer having the largest tire widthwise width among the plurality of inclined belt layers forming the inclined belt is 90% to 115% of a tread width TW.

12. The pneumatic tire according to claim 1, wherein the pneumatic tire comprises a plurality of belt layers forming a belt, and
a tire circumferential rigidity per unit width of a central region C of the belt, inclusive of the tire equator plane CL, is higher than the tire circumferential rigidity per unit width of the other regions.

13. The pneumatic tire according to claim 1, wherein the pneumatic tire comprises a plurality of circumferential belt layers forming a circumferential belt, and
wherein each belt layer is formed by a plurality of cords,
wherein Y represents a Young's modulus (GPa) of the cords,
wherein n represents a number of the cords per unit length,
wherein m represents a number of the circumferential belt layers,
wherein $X=Y \times n \times m$, and
$1500 \geq X \geq 750$.

14. The pneumatic tire according to claim 1, wherein the pneumatic tire has a sidewall portion, and
the sidewall portion has a gauge Ts at a tire maximum width position in a tire radial direction, and the bead core has a bead width Tb at a tire radial center position, and
a ratio of Ts to Tb (Ts/Tb) falls within a range of 15% or more and 40% or less.

15. The pneumatic tire according to claim 1, wherein the pneumatic tire includes a carcass and a sidewall portion, and
the sidewall portion has a gauge Ts at the tire maximum width position in a tire radial direction, and the carcass has a carcass cord with a diameter Tc, and a ratio of Ts to Tc (Ts/Tc) is 5 or more and 10 or less.

* * * * *